(12) United States Patent
Cha et al.

(10) Patent No.: US 10,071,694 B2
(45) Date of Patent: Sep. 11, 2018

(54) CARRIER APPARATUS FOR VEHICLE

(71) Applicant: Hyundai Motor Company, Seoul (KR)

(72) Inventors: Dong Eun Cha, Gyeonggi-do (KR);
Jin Young Yoon, Gyeonggi-do (KR);
Seung Mok Lee, Gyeonggi-do (KR);
Hyun Gyung Kim, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 116 days.

(21) Appl. No.: 15/145,473

(22) Filed: May 3, 2016

(65) Prior Publication Data
US 2017/0166139 A1 Jun. 15, 2017

(30) Foreign Application Priority Data
Dec. 10, 2015 (KR) .......................... 10-2015-0176209

(51) Int. Cl.
*B60R 9/00* (2006.01)
*B60R 11/00* (2006.01)
*B60R 9/06* (2006.01)
*B60R 9/10* (2006.01)

(52) U.S. Cl.
CPC . *B60R 9/06* (2013.01); *B60R 9/10* (2013.01)

(58) Field of Classification Search
CPC .... B60R 9/06; B60R 9/10; B60R 9/12; B60R 9/052
USPC ........................................................ 224/489
See application file for complete search history.

(56) References Cited

U.S. PATENT DOCUMENTS

| | | | |
|---|---|---|---|
| 4,676,415 A * | 6/1987 | Kennedy | B62D 43/04 224/42.21 |
| 5,579,973 A | 12/1996 | Taft | |
| 7,854,358 B2 * | 12/2010 | Bergerhoff | B60R 9/06 224/281 |
| 9,039,263 B2 * | 5/2015 | Hofmann | B60R 9/10 362/549 |
| 2008/0006667 A1 * | 1/2008 | Bergerhoff | B60R 9/048 224/533 |
| 2008/0142559 A1 * | 6/2008 | Lim | B60R 9/06 224/489 |
| 2008/0206030 A1 * | 8/2008 | Reuille | B60P 1/4421 414/462 |
| 2011/0108592 A1 | 5/2011 | Lee et al. | |

(Continued)

FOREIGN PATENT DOCUMENTS

| | | |
|---|---|---|
| EP | 2610111 A1 | 7/2013 |
| KR | 10-0773082 B1 | 11/2007 |

(Continued)

*Primary Examiner* — Derek Battisti
(74) *Attorney, Agent, or Firm* — Mintz Levin Cohn Ferris Glovsky and Popeo, P.C.; Peter F. Corless

(57) ABSTRACT

A carrier apparatus for a vehicle is disposed on a bumper back beam in the rear part of a vehicle. The carrier apparatus normally is not exposed externally, and is withdrawn from the bumper back beam such that a bicycle can be loaded thereon when the bicycle is required to be loaded. It is thereby possible to preserve a vehicle's aesthetic exterior appearance and improve convenience. When the carrier is withdrawn, the license plate and the fixing bar rotate in concert with each other. When the carrier is retracted, the fixing bar and the license plate are folded together. Consequently, convenience is further increased, thereby improving the marketability of the carrier apparatus.

13 Claims, 4 Drawing Sheets

(56) References Cited

U.S. PATENT DOCUMENTS

| | | | | |
|---|---|---|---|---|
| 2012/0024923 A1* | 2/2012 | Cha | ............................ | B60R 9/10 |
| | | | | 224/533 |
| 2013/0182454 A1* | 7/2013 | Hofmann | .................. | B60R 9/10 |
| | | | | 362/549 |
| 2016/0152190 A1* | 6/2016 | Lee | ............................ | B60R 9/10 |
| | | | | 224/489 |

FOREIGN PATENT DOCUMENTS

| | | | |
|---|---|---|---|
| KR | 10-1411891 | B1 | 6/2014 |
| KR | 10-1558800 | B1 | 10/2015 |

\* cited by examiner

CARRIER APPARATUS FOR VEHICLE

CROSS REFERENCE TO RELATED APPLICATION

The present application claims under 35 U.S.C. § 119(a) the benefit of Korean Patent Application No. 10-2015-0176209, filed Dec. 10, 2015, the entire contents of which are incorporated by reference herein.

BACKGROUND

1. Field of the Invention

The present invention generally relates to a carrier apparatus for a vehicle, the carrier apparatus being disposed on a rear bumper side of the vehicle such that a bicycle or luggage can be loaded thereon.

2. Description of the Related Art

It is known to provide a system enabling one or more bicycles to be mounted on a vehicle in order to transport the bicycles.

However, since bicycles are typically bulky, it is difficult to load a bicycle in a trunk of the vehicle or a rear side of a cabin of the vehicle.

In order to overcome such problems, various attempts of loading a bicycle on the exterior of a vehicle have been proposed. However, with respect to attempts to fixedly load a bicycle on the roof panel of the vehicle, such loading operations have proved difficult. In addition, since the height of the vehicle likely is increased, when the vehicle enters a tunnel or a building, an accident in which the bicycle collides against the tunnel or the building may occur.

In attempting to load a bicycle on the rear end of the tail gate of a vehicle, a separate carrier apparatus must be attached to the tail gate, which is problematic. Since the carrier apparatus is exposed externally in ordinary times in which no bicycle is loaded thereon, the carrier apparatus degrades an aesthetic exterior appearance of a vehicle.

In addition, the use of a separate carrier apparatus lacks convenience, since the carrier apparatus must be manually attached to the vehicle when a bicycle is required to be loaded and is detached from the vehicle when the loading of a bicycle is not required.

In particular, when a bicycle is loaded on the exterior of the vehicle using the carrier apparatus, a vehicle trailing behind may not recognize the loaded bicycle. This may cause an accident in that the trailing vehicle approaches close to and may collide with the vehicle on which the bicycle is loaded.

The foregoing is intended merely to aid in the understanding of the background of the present invention, and is not intended to mean that the present invention falls within the purview of the related art that is already known to those skilled in the art.

SUMMARY

The present invention is directed to a carrier apparatus for a vehicle disposed on a bumper back beam in a rear part of the vehicle. The carrier apparatus normally is not exposed externally, and is withdrawn from the bumper back beam such that a bicycle can be loaded thereon when the bicycle is required to be loaded. It is thereby possible to preserve a vehicle's aesthetic exterior appearance and improve convenience.

In order to achieve the above object, according to one aspect of the present invention, a carrier apparatus for a vehicle includes: a carrier part disposed to slide in a forward and backward direction under a bumper back beam such that the carrier part is withdrawn or retracted, the carrier part including a panel and slide rails extending from both ends of the panel in the forward and backward direction; a license plate including a holder, the license plate being disposed on the panel of the carrier part such that the license plate is rotatable in an upward and downward direction; a fixing device selectively fastened with the license plate, thereby fixing the license plate in a position to which the license plate is rotated; and a fixing bar disposed on the slide rails of the carrier part such that the fixing bar is elastically rotatable upwards, wherein, when the carrier part is retracted, the fixing bar is caught by the fixing device such that the fixing bar is folded downwards together with the license plate, and when the carrier part is withdrawn, the fixing bar pushes the license plate upwards such that the fixing bar rotates upwards together with the license plate.

The bumper back beam may include guide rails extending in the forward and backward direction. The slide rails of the carrier part may be connected to the guide rails such that the slide rails are slidable on the guide rails.

The carrier part may include: extension rails extending across the slide rails; and extension supports slidable along the extension rails in a transverse direction.

The carrier part may further include a hinge bracket disposed on an upper portion of the panel, the hinge bracket having a hinge pin; and the license plate further includes a rotatable bracket rotatably connected to the hinge bracket by means of the hinge pin.

The rotatable bracket of the license plate may have a fixing hole. The fixing device may include: a fixing pin disposed on the hinge bracket, the fixing pin elastically protruding and being fitted into the fixing hole; and an operating portion causing the fixing pin to be selectively released from the fixing hole.

The rotatable bracket may have a plurality of the fixing holes such that the fixing pin is fitted into one of the plurality of fixing holes in an erected position in which the license plate is rotated upwards and in a position in which the license plate is tilted to a predetermined angle.

The operating portion may include a solenoid coil able to change a magnetic field in response to electric power applied thereto, thereby driving the fixing pin.

The panel of the carrier part may include a manipulation button. The operating portion may operate depending on whether or not the manipulation button is manipulated, thereby causing the fixing pin to be released from the fixing hole.

The holder of the license plate may include: a housing fixed to a surface portion of the license plate that faces the fixing bar in a position in which the license plate is rotated upwards; and a catching hook connected to the housing such that the catching hook is slidable within the housing in the upward and downward direction, the catching hook elastically moving upwards.

The housing may have a guide slot that extends in the upward and downward direction in the position in which license plate is rotated upwards. The catching hook may include: a movable member elastically supported within the housing; and a catching finger extending externally from the movable member through the guide slot.

Each of the slide rails of the carrier part may include a bracket. The bracket may include: a recess formed in a direction in which the fixing bar rotates; and a hinge pin extending through and fixed within the bracket, wherein the fixing bar is allowed to be rotatably engaged with the hinge pin.

The hinge pin of the bracket may include an elastic member, and is connected to the fixing bar, such that the fixing bar is rotatable upwards due to an elastic force of the elastic member.

The bumper back beam may include a guide member fixedly disposed over the fixing bar, the guide member butting against the fixing bar, which elastically rotates with respect to the carrier part, thereby supporting rotation of the fixing bar.

According to the carrier apparatus, the bicycle carrier is disposed on the bumper back beam in the rear side of the vehicle. In an ordinary position, the carrier apparatus is not exposed externally. In addition, the carrier apparatus is automatically withdrawn from the bumper back beam 10 such that a bicycle can be loaded thereon. This can present the vehicle's aesthetic exterior appearance and improve convenience.

Furthermore, when the carrier is withdrawn, the license plate and the fixing bar rotate in concert with each other. When the carrier is retracted, the fixing bar and the license plate are folded together. Consequently, convenience is further increased, thereby improving the marketability of the carrier apparatus.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present invention may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, a carrier apparatus for a vehicle according to an exemplary embodiment of the present invention will be described with reference to the accompanying drawings.

Figure 1:
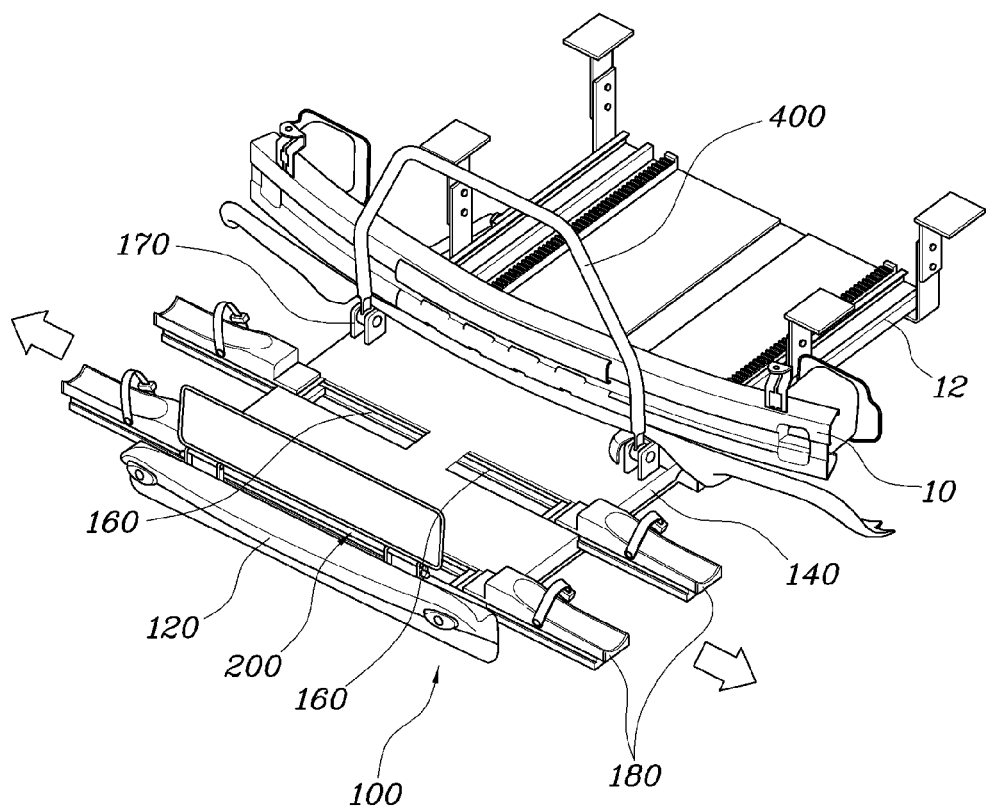
FIG. 1 is a perspective view illustrating a carrier apparatus for a vehicle according to an embodiment of the present invention.
Figure 2:
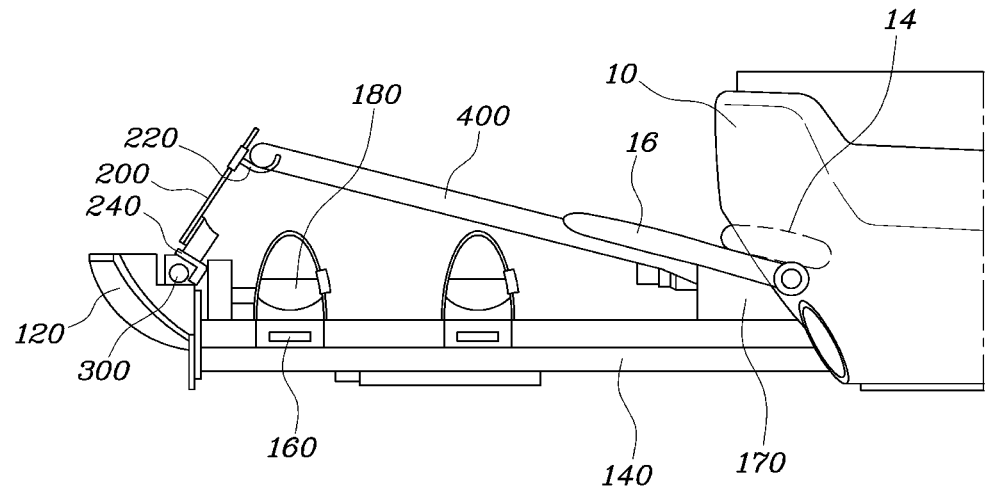
FIG. 2 is a side elevation view illustrating the carrier apparatus for the vehicle of FIG. 1.

FIG. 1 is a perspective view illustrating a carrier apparatus according to the embodiment of the present invention, FIG. 2 is a side elevation view illustrating the carrier apparatus of FIG. 1, and FIGS. 3 to 6 are perspective views illustrating parts of the carrier apparatus illustrated in FIG. 1.

As illustrated in FIGS. 1 and 2, a carrier apparatus for a vehicle includes a carrier part 100, a license plate 200, a fixing device 300, and a fixing bar 400. The carrier part 100 is disposed so as to slide in a forward and backward direction under a bumper back beam 10 such that the carrier part 100 is withdrawn or retracted. The carrier part 100 includes a panel 120 and slide rails 140 extending from both ends of the panel 120 in the forward and backward direction. The license plate 200 is disposed on the panel 120 of the carrier part 100 such that the license plate 200 is rotatable in an upward and downward direction. The license plate 200 preferably has a holder 220. The fixing device 300 is disposed on the panel 120 such that the fixing device 300 is selectively fastened with the license plate 200, thereby fixing the license plate 200 in a position to which the license plate 200 is rotated. The fixing bar 400 is disposed on the slide rails 140 of the carrier part 100 such that the fixing bar 400 can elastically rotate upwards. When the carrier part 100 is retracted, the fixing bar 400 is caught by the fixing device 300 such that the fixing bar 400 is folded downwards together with the license plate 200. When the carrier part 100 is withdrawn, the fixing bar 400 pushes the license plate 200 upwards such that the fixing bar 400 rotates upwards together with the license plate 200.

As described above, in the carrier apparatus according to the present embodiment, the carrier part 100 can slide with respect to the bumper back beam 10. The carrier part 100 includes extension supports 180 disposed thereon, the extension supports 180 being configured to deploy in an extended state. The extension supports 180 are movable in the transverse direction of the carrier part 100 depending on the size of a bicycle and/or luggage. With this configuration, in an ordinary position, the carrier part 100 is retracted into the space inside the bumper back beam 10, such that the carrier part 100 is not exposed externally. When the bicycle and/or the luggage is required to be loaded, the carrier part 100 is withdrawn from the bumper back beam 10 such that the bicycle and/or the luggage can be loaded thereon. The extension supports 180, which will be described later, may be provided in pairs, in each of which the extension supports 180 are symmetrically disposed. The extension supports 180 in each pair are configured to extend in opposite directions such that the distance between the extension supports 180 increases when the extension supports 180 are deployed to the extended state. Accordingly, the distance between the extension supports 180 can be adjusted depending on the size of a bicycle.

In particular, in the carrier apparatus according to the present embodiment, the license plate 200 enables a license plate number to be identified by occupants of trailing vehicles in a position in which the carrier part 100 is withdrawn. The fixing bar 400 serves to fix the bicycle and/or the luggage loaded on the carrier part 100.

The license plate 200 and the fixing bar 400 are folded in the position in which the carrier part 100 is retracted into the space inside the bumper back beam 10. When the carrier part 100 is withdrawn from the bumper back beam 10, the license plate 200 and the fixing bar 400 are rotated upwards. According to the present embodiment, when the carrier part 100 is withdrawn, the license plate 200 and the fixing bar 400 are automatically rotated in order to improve the convenience of the user. In this regard, the license plate 200 and the fixing bar 400 work in concert with each other to be folded when the carrier part 100 is retracted and to be rotated to a use position when the carrier part 100 is withdrawn.

In further detail, as illustrated in FIG. 1, the bumper back beam 10 has guide rails 12 extending in the forward and backward direction. The slide rails 140 of the carrier part 100 may be connected to the guide rails 12 such that the slide rails 140 can slide on the guide rails 12.

Specifically, the carrier part 100 is configured such that the slide rails 140 can move along the guide rails 12 fixedly disposed on the bumper back beam 10. Here, the carrier part 100 may be configured such that the carrier part 100 is withdrawn or retracted along the guide rails 12 under automatic control. For example, referring to FIG. 6, the carrier part 100 further includes a drive motor 20 connected to the guide rails 12. Links extending from the drive motor 20 butt against the guide rails 12, such that the carrier part 100 can move along the guide rails 12 when the drive motor 20 operates. In this regard, pinions 24 are provided on distal ends of the links 22, and the guide rails 12 have rack structures, such that the guide rails 12 and the pinions 24 can be connected in a rack and pinion structure. The user can control the operation of the drive motor 20 using a remote control.

As illustrated in FIGS. 1 and 2, the carrier part 100 includes extension rails 160 extending across the slide rails 140, such that the extension supports 180 can slide along the extension rails 160 in the transverse direction.

Specifically, the carrier part 100 includes the extension rails 160 extending in the transverse direction, and the extension supports 180 are connected to the extension rails 160 such that the extension supports 180 can slide along the extension rails 160. The extension supports 180 are provided in pairs, in each of which the extension supports 180 are deployed to extend in the opposite directions, such that the distance therebetween can be set to the length of a bicycle.

Figure 3:
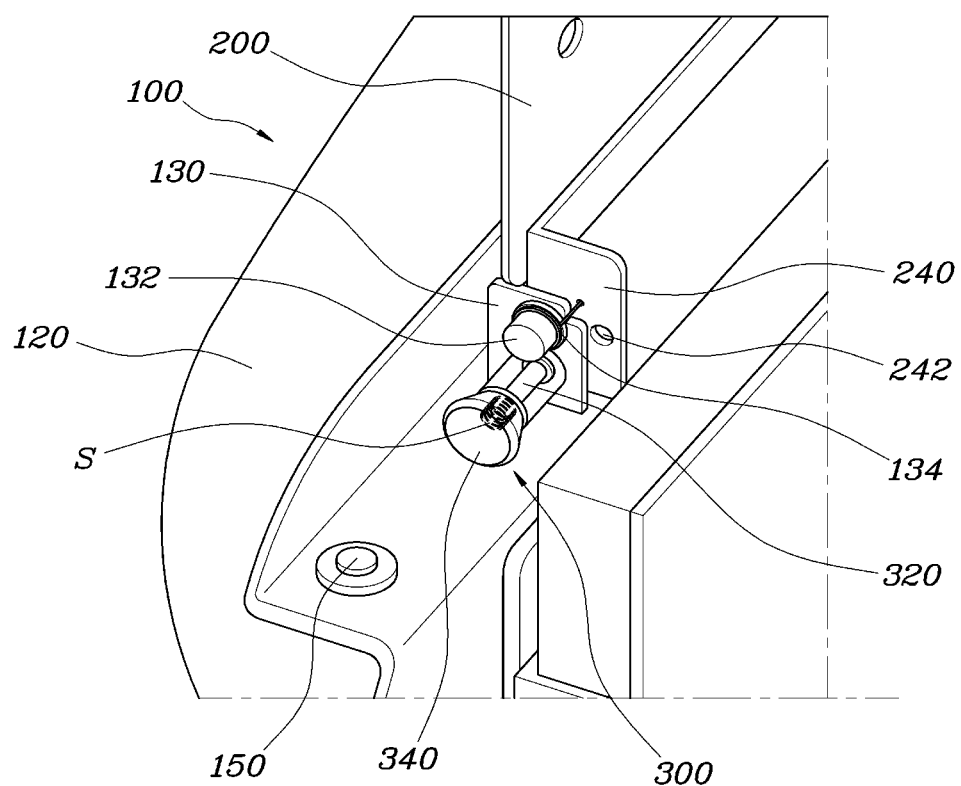
FIGS. 3 to 6 are perspective views illustrating parts of the carrier apparatus illustrated in FIG. 1.

As illustrated in FIG. 3, a hinge bracket 130 having a hinge pin 132 is disposed on the upper portion of the panel 120 of the carrier part 100, and the license plate 200 has a rotatable bracket 240 that is rotatably connected to the hinge bracket 130 by means of the hinge pin 132. Here, the hinge pin 132 has a torsion spring 132, which is connected to the rotatable bracket 240, such that the license plate 200 can automatically rotate.

Specifically, the rotatable bracket 240 is disposed on the lower end of the license plate 200. The rotatable bracket 240 is connected to the hinge bracket 130, disposed on the panel 120 of the carrier part 100, by means of the hinge pin 132, such that the license plate 200 can rotate on the panel 120 of the carrier part 100 in the upward and downward direction. Here, the license plate 200 can be folded to the upper portion of the carrier part 100 when rotated downwards and can be rotated to the erected position when rotated upwards.

In this regard, the rotatable bracket 240 of the license plate 200 has fixing holes 242. In addition, the fixing device 300 includes a fixing pin 320 disposed on the hinge bracket 130, the fixing pin 320 elastically protruding and being fitted into a fixing hole of the fixing holes 242, and an operating portion 340 causing the fixing pin 320 to be selectively released from the fixing hole 242.

According to the above-described configuration, when the fixing pin 320 of the fixing device 300 is fitted into the fixing hole 242 formed in the rotatable bracket 240 of the license plate 200, the license plate 200 is fixed in position. The license plate 200 can be maintained in a vertically rotated position, a folded position, or a position tilted to a predetermined angle.

Thus, the rotatable bracket 240 has a plurality of fixing holes 242 such that the fixing pin 320 can be fitted into one of the plurality of fixing holes 242 in an erected position in which the license plate 200 is rotated upwards and in a position in which the license plate 200 is tilted to a predetermined angle. The plurality of fixing holes 242 may be arranged on concentric circles around the hinge pin 132 of the hinge bracket 130, to which the lower portion of the license plate 200 is engaged. The plurality of fixing holes 242 may be formed such that the rotation of the license plate 200 is restrained in a position in which the license plate 200 is rotated upwards and in a position in which the license plate 200 is tilted to a predetermined angle, as well as in a position in which the license plate 200 is folded to a predetermined angle. Here, the fixing holes 242 for fixing the license plate 200, in the position in which the license plate 200 is tilted to a predetermined angle, may be formed to have a gentle inclination. Even in the case in which the fixing pin 320 is fitted into a fixing hole of the fixing holes 242, when a predetermined amount of external force is applied, the fixing pin 320 can be released from the fixing hole 242, such that proper operations can be performed. This will be described again in the following description of the operating state.

The fixing device 300 may be a solenoid including the fixing pin 320 and the operating portion 340. The fixing pin 320 is elastically supported by an elastic spring S within the operating portion 340, thereby moving toward the fixing hole 242 of the rotatable bracket 240. When the operating portion 340 operates, the fixing pin 320 retreats against the elastic force of the elastic spring S, thereby being selectively released from the fixing hole 242. Consequently, the operating portion 340 may be configured as a solenoid coil able to change a magnetic field in response to electric power applied thereto, thereby driving the fixing pin 320. That is, the fixing device 300 may be configured as the solenoid able to change the magnetic field in response to electric power applied to the operating portion 340, thereby causing the fixing pin 320 to be selectively fitted into the fixing hole 242, whereby the license plate 200 is fixed in the position to which the license plate 200 is rotated.

In this regard, the panel 120 of the carrier part 100 has a manipulation button 150. The operating portion 340 may operate depending on whether or not the manipulation button 150 is manipulated, thereby causing the fixing pin 320 to be released from the fixing hole 242. The manipulation button 150 is disposed on or adjacent to the panel 120 such that the manipulation button 150 can be conveniently manipulated in the position in which the carrier part 100 is withdrawn. When the manipulation button 150 is manipulated, it is possible to adjust the position of the license plate 200 by controlling the fixing pin 320 to move by applying electric power to the operating portion 340. The manipulation button 150 may be disposed not only on the panel 120, but also on or adjacent to the driver's seat. In addition, the manipulation button 150 may be controlled using a separate remote control, such that the convenience of the user can be further increased.

Figure 4:
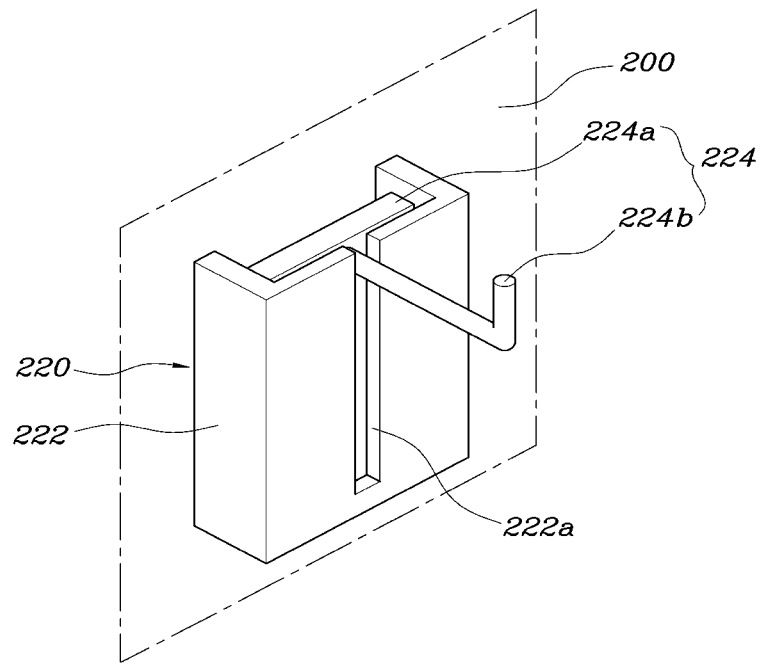

In addition, as illustrated in FIG. 4, the holder 220 of the license plate 200 includes a housing 222 and a catching hook 224. The housing 222 is fixed to the surface portion of the license plate 200 that faces the fixing bar 400 in the position in which the license plate 200 is rotated upwards. The catching hook 224 is connected to the housing 222 such that the catching hook 224 can slide within the housing 222 in the upward and downward direction. The catching hook 224 elastically moves upwards.

That is, the holder 220 includes the housing 222 fixed to the surface portion of the license plate 200 facing the fixing bar 400 and the catching hook 224 sliding within the housing 222. The catching hook 224 is configured such that the fixing bar 400 is caught thereby. When the carrier part 100 is withdrawn or retracted, the catching hook 224 works in concert with the fixing bar 400, thereby causing the license plate 200 to rotate. Since the catching hook 224 is elastically supported within the housing 222 in the upward direction, the catching hook 224 remains catching the fixing bar 400, which is rotated when the carrier part 100 is withdrawn or retracted, whereby the fixing bar 400 and the license plate 200 work in concert with each other. This will be described in detail in the following description of the operating state The housing 222 has a guide slot 222a that extends in the upward and downward direction in the position in which license plate 200 is rotated upwards. The catching hook 224 includes a movable member 224a elastically supported within the housing 222 and a catching finger 224b extending externally from the movable member 224a through the guide slot 222a.

Specifically, the movable member 224a of the catching hook 224 slides within the housing 222. The catching finger 224b, extending from the movable member 224a and exposed externally through the guide slot 222a, serves to catch the fixing bar 400. When the carrier part 100 is withdrawn or retracted in the position in which the fixing bar 400 is caught by the catching finger 224b, variations in position caused by the rotation of the fixing bar 400 are absorbed by the movement of the movable member 224a, whereby smooth operational relationships can be realized. Here, the movable member 224a may be elastically supported by a spring (not shown) disposed within the housing in order to remain in the initial position.

Figure 5:
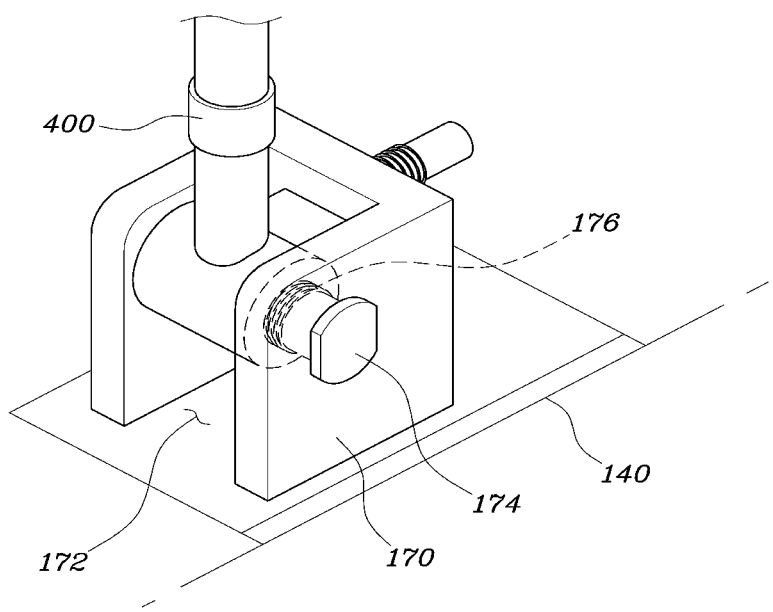
Figure 6:
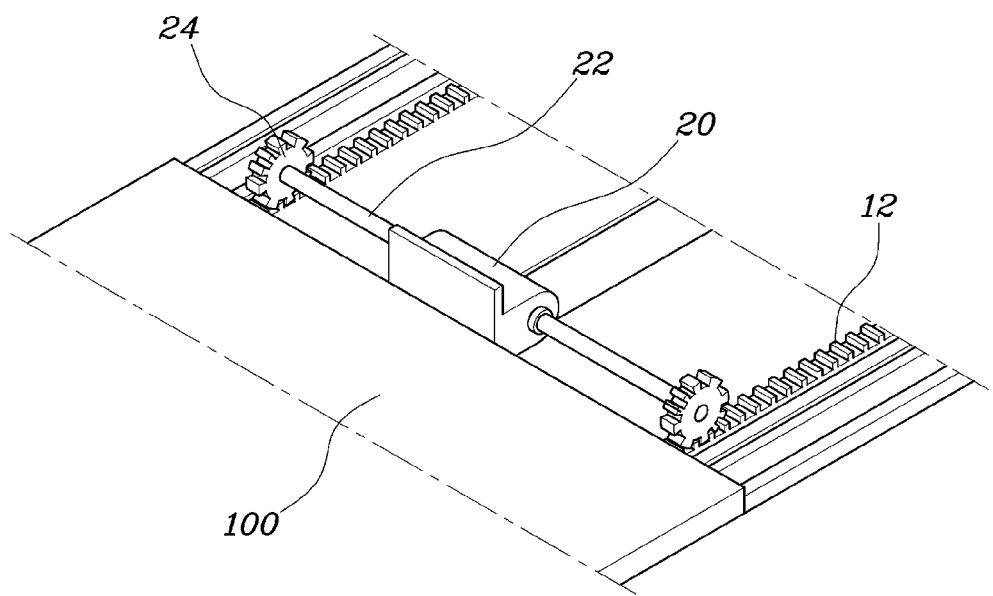

As illustrated in FIG. 5, each of the slide rails 140 of the carrier part 100 has a bracket 170 in which a recess 172 is formed in the direction of the rotation of the fixing bar 400. A hinge pin 174 extends through and is fixed to the bracket 170. The fixing bar 400 may be rotatably engaged with the hinge pin 174 fixed within the bracket 170.

Here, the hinge pin 174 of the bracket 170 has an elastic member 176, and is connected to the fixing bar 400, such that the fixing bar 400 can be rotated upwards due to the elastic force of the elastic member 176.

As described above, in each of the slide rails 140 of the carrier part 100, the hinge pin 174 is fixed to the bracket 170, and the fixing bar 400 is rotatably connected to the hinge pin 174, whereby the fixing bar 400 can rotate. Here, the recess 172 is formed in the bracket 170 in the direction facing the license plate 200, whereby the fixing bar 400 can rotate toward the license plate 200. Since the rotation of the fixing bar 400 is only allowed to the portion in which the recess 172 is formed, the position to which the fixing bar 400 is rotated can be reliably maintained.

In addition, the present embodiment must be configured such that the fixing bar 400 rotates upwards when the carrier part 100 is withdrawn. Since the hinge pin 174 and the elastic member 176 connected to the fixing bar 400 are disposed within the bracket 170, when the carrier part 100 is withdrawn and the fixing bar 400 is allowed to rotate, the fixing bar 400 automatically rotates such that the fixing bar 400 can be used.

As illustrated in FIG. 2, the bumper back beam 10 includes a guide member 14 fixedly disposed over the fixing bar 400. The guide member 14 butts against the fixing bar 400, which elastically rotates with respect to the carrier part 100, thereby supporting the rotation of the fixing bar 400.

Since the guide member 14 is disposed on the bumper back beam 10 as described above, in the position in which the carrier part 100 is retracted into the bumper back beam 10, the guide member 14 butts against the fixing bar 400 to restrain the rotation of the fixing bar 400. When the carrier part 100 is withdrawn from the bumper back beam 10, the guide member 14 releases the fixing bar 400 such that the fixing bar 400 can rotate. It is preferable that the fixing bar 400 further includes a butting member 16 butting against the guide member 14 in order to further facilitate rotation when the fixing bar 400 butts against the guide member 14.

This configuration can consequently prevent the fixing bar 400 from directly butting against the bumper back beam 10, such that no damages, such as scratches, are formed on the bumper back beam 10. In addition, this configuration also ensures that the fixing bar 400 is correctly folded or rotated through butting against the guide member 14.

Hereinafter, the operation of the above-described embodiment will be described. In the position in which the carrier part 100 is retracted into the bumper back beam 10, the fixing bar 400 is caught by the catching hook 224 of the holder 220 of the license plate 200. In response to the movable member 224a of the catching hook 224 moving against the elastic force of the spring (not shown), the fixed end, by which the fixing bar 400 is caught, moves together with the movable member 224a Consequently, the license plate 200 and the fixing bar 400, connected to each other by means of the holder 220, are folded on the carrier part 100.

In this position, as illustrated in FIG. 2, when the carrier part 100 is withdrawn, the fixing bar 400 is released from the guide member 14, converting to a rotatable position. The fixing bar 400 is then rotated upwards by the elastic member 176 disposed on the bracket 170 of the carrier part 100. Since the fixing bar 400 is connected to the license plate 200 by means of the holder 220, the license plate 200 rotates in concert with the fixing bar 400. That is, at the moment that the fixing bar 400 is connected to the holder 220 of the license plate 200, the fixing bar 400 butts against the upper end of the license plate 200, thereby pushing and rotating the license plate 200 upwards. Here, when the license plate 200 is rotated to a predetermined angle, the fixing pin 320 of the fixing device 300 is fitted into a fixing hole of the fixing holes 242 of the bracket 240, such that the corresponding position is fixed. Consequently, the fixing bar 400 caught by the holder 220 of the license plate 200 remains in the position in which the fixing bar 400 is rotated to the predetermined angle. Thus, even in the case in which the carrier part 100 is withdrawn, it is possible to primarily restrain the positions of the license plate 200 and the fixing bar 400. Consequently, the fixing bar 400 can be rotated by the elastic force of the elastic member, thereby preventing damage that would otherwise be caused by impact. In addition, the user can correctly recognize the use of the license plate 200 and the fixing bar 400, and can convert the license plate 200 and the fixing bar 400 to use positions.

As described above, the carrier part 100 is withdrawn as illustrated in FIG. 2, in which the license plate 200 and the fixing bar 400 remain tilted to a predetermined angle. In this position, when the user manipulates the manipulation button 150, the operating portion 340 of the fixing device 300 operates, such that the fixing pin 320 is released from the fixing hole 242, whereby the final rotation of the license plate 200 and the fixing bar 400 is allowed. Consequently, the fixing bar 400 pushes the license plate 200 and then is completely erected through rotation. As the license plate 200 is completely rotated in response to the user manipulation or through the torsion spring 134, the rotation of the license plate 200 and the fixing bar 400 is completed after the withdrawal of the carrier part 100.

In contrast, when the carrier part 100 is retracted, the fixing pin 320 of the fixing device 300 is released from the fixing hole 242 in response to the manipulation button 150 being manipulated, and the license plate 200 is rotated and tilted to a predetermined angle. In this position, when the carrier part 100 is retracted, the fixing bar 400 is rotated downwards by being pressed by the guide member 14. The downwardly-rotating fixing bar 400 is caught by the holder 220 of the license plate 200, such that the license plate 200 is rotated downwards along with the fixing bar 400. Here, in the position in which the license plate 200 is tilted to the predetermined angle, the fixing hole 242 has a gentle inclination. Thus, when the fixing bar 400 presses the license plate 200 downwards, the fixing pin 320 can be smoothly released along the inclined surface. Consequently, in response to the carrier part 100 being retracted, the fixing bar 400 and the license plate 200 are gradually rotated downwards, thereby obtaining the completely-folded position.

According to the carrier apparatus, the bicycle carrier is disposed on the bumper back beam 10 in the rear side of the vehicle. In normal operation, the carrier apparatus is not exposed externally. In addition, the carrier apparatus is automatically withdrawn from the bumper back beam 10 such that a bicycle can be loaded thereon. This can preserve the vehicle's aesthetic exterior appearance and improve convenience.

Further, when the carrier is withdrawn, the license plate 200 and the fixing bar 400 rotate in concert with each other. When the carrier is retracted, the fixing bar 400 and the license plate 200 are folded together. Consequently, convenience is further increased, thereby improving the marketability of the carrier apparatus.

Although the exemplary embodiment of the present invention has been described for illustrative purposes, those skilled in the art will appreciate that various modifications, additions and substitutions are possible, without departing from the scope and spirit of the present invention as disclosed in the accompanying claims.

What is claimed is:

1. A carrier apparatus for a vehicle, comprising:
   a carrier part disposed to slide in a forward and backward direction under a bumper back beam such that the carrier part is withdrawn or retracted, the carrier part comprising a panel and slide rails extending from both ends of the panel in the forward and backward direction;
   a license plate comprising a holder configured to be elastically movable in an upward and downward direction relative to the license plate, the license plate being disposed on the panel of the carrier part such that the license plate is rotatable in an upward and downward direction;
   a fixing device selectively fastened with the license plate, thereby fixing the license plate in a position to which the license plate is rotated; and
   a fixing bar disposed on the slide rails of the carrier part such that the fixing bar is elastically rotatable upwards, wherein, when the carrier part is retracted, the fixing bar is caught by the holder such that the fixing bar is folded downwards together with the license plate, and when the carrier part is withdrawn, the fixing bar pushes the license plate upwards such that the fixing bar rotates upwards together with the license plate.

2. The carrier apparatus according to claim 1, wherein:
   the bumper back beam comprises guide rails extending in the forward and backward direction, and
   the slide rails of the carrier part are connected to the guide rails such that the slide rails are slidable on the guide rails.

3. The carrier apparatus according to claim 1, wherein the carrier part comprises:
   extension rails extending across the slide rails; and
   extension supports slidable along the extension rails in a transverse direction.

4. The carrier apparatus according to claim 1, wherein:
   the carrier part further comprises a hinge bracket disposed on an upper portion of the panel, the hinge bracket having a hinge pin; and
   the license plate further comprises a rotatable bracket rotatably connected to the hinge bracket by means of the hinge pin.

5. The carrier apparatus according to claim 4, wherein:
   the rotatable bracket of the license plate has a fixing hole, and
   the fixing device comprises: a fixing pin disposed on the hinge bracket, the fixing pin elastically protruding and being fitted into the fixing hole; and an operating portion causing the fixing pin to be selectively released from the fixing hole.

6. The carrier apparatus according to claim 5, wherein the rotatable bracket has a plurality of the fixing holes such that the fixing pin is fitted into one of the plurality of fixing holes in an erected position in which the license plate is rotated upwards and in a position in which the license plate is tilted to a predetermined angle.

7. The carrier apparatus according to claim 5, wherein the operating portion comprises a solenoid coil able to change a magnetic field in response to electric power applied thereto, thereby driving the fixing pin.

8. The carrier apparatus according to claim 5, wherein:
   the panel of the carrier part comprises a manipulation button, and the operating portion operates depending on whether or not the manipulation button is manipulated, thereby causing the fixing pin to be released from the fixing hole.

9. The carrier apparatus according to claim 1, wherein the holder of the license plate comprises:
a housing fixed to a surface portion of the license plate that faces the fixing bar in a position in which the license plate is rotated upwards; and
a catching hook connected to the housing such that the catching hook is slidable within the housing in the upward and downward direction, the catching hook elastically moving upwards.

10. The carrier apparatus according to claim 9, wherein:
the housing has a guide slot that extends in the upward and downward direction in the position in which license plate is rotated upwards, and
the catching hook comprises: a movable member elastically supported within the housing; and a catching finger extending externally from the movable member through the guide slot.

11. The carrier apparatus according to claim 1, wherein each of the slide rails of the carrier part comprises a bracket, the bracket comprising: a recess formed in a direction in which the fixing bar rotates; and a hinge pin extending through and fixed within the bracket, wherein the fixing bar is allowed to be rotatably engaged with the hinge pin.

12. The carrier apparatus according to claim 11, wherein the hinge pin of the bracket comprises an elastic member, and is connected to the fixing bar, such that the fixing bar is rotatable upwards due to an elastic force of the elastic member.

13. The carrier apparatus according to claim 1, wherein the bumper back beam comprises a guide member fixedly disposed over the fixing bar, the guide member butting against the fixing bar, which elastically rotates with respect to the carrier part, thereby supporting rotation of the fixing bar.

* * * * *